US012566405B2

(12) United States Patent
Mori

(10) Patent No.: US 12,566,405 B2
(45) Date of Patent: Mar. 3, 2026

(54) IMAGE FORMING APPARATUS INCLUDING MAIN CASING TO WHICH CARTRIDGE IS ATTACHABLE AND MAIN MEMORY AND METHOD OF CONTROLLING IMAGE FORMING APPARATUS

(71) Applicant: BROTHER KOGYO KABUSHIKI KAISHA, Nagoya (JP)

(72) Inventor: Rintaro Mori, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/827,000

(22) Filed: Sep. 6, 2024

(65) Prior Publication Data

US 2025/0085662 A1 Mar. 13, 2025

(30) Foreign Application Priority Data

Sep. 8, 2023 (JP) ................................ 2023-146342

(51) Int. Cl.
*G03G 21/00* (2006.01)
*B41J 2/175* (2006.01)
(Continued)

(52) U.S. Cl.
CPC ...... *G03G 21/1878* (2013.01); *B41J 2/17546* (2013.01); *G03G 15/0863* (2013.01);
(Continued)

(58) Field of Classification Search
CPC ........... G03G 15/5016; G03G 15/5091; G03G 15/5079; G03G 15/0863; G03G 21/1892;
(Continued)

(56) References Cited

U.S. PATENT DOCUMENTS 6,658,219 B1 12/2003 Ito et al.
2021/0232089 A1* 7/2021 Kyotani ............... G06F 3/1219
(Continued)

FOREIGN PATENT DOCUMENTS

JP 2001-100530 A 4/2001
JP 2021-160229 A 10/2021
(Continued)

*Primary Examiner* — Robert B Beatty
(74) *Attorney, Agent, or Firm* — Merchant & Gould P.C.

(57) ABSTRACT

An image forming apparatus includes: a main casing; a main memory; and a controller. A cartridge is detachably attachable to the main casing. The cartridge includes a cartridge memory storing therein identification information identifying the cartridge. The main memory is configured to store therein history information including history identification information. The history identification information is identification information for a previous subscription cartridge previously attached to the main casing. The controller is configured to perform: in response to a cartridge being attached to the main casing, (a) reading identification information from a cartridge memory of the attached cartridge as current identification information; (b) determining whether the current identification information read in (a) matches the history identification information included in the history information stored in the main memory; and in response to determining in (b) that the current identification information matches the history identification information, (c) permitting use of the attached cartridge.

13 Claims, 10 Drawing Sheets

(51) Int. Cl.
*G03G 15/00* (2006.01)
*G03G 15/08* (2006.01)
*G03G 21/18* (2006.01)

(52) U.S. Cl.
CPC . *G03G 15/5091* (2013.01); *G03G 2215/0695* (2013.01); *G03G 2221/1823* (2013.01)

(58) Field of Classification Search
CPC ........... G03G 21/1875; G03G 21/1878; G03G 21/1896; G03G 21/1889; G03G 2215/0695; G03G 2215/0697; G03G 2221/1823; B41J 2/17543; B41J 2/17546; G06F 3/1238; G06F 3/1239; G06F 3/1218
USPC ..................................... 399/8, 11, 12, 24, 79
See application file for complete search history.

(56) References Cited

U.S. PATENT DOCUMENTS

| | | | | | |
|---|---|---|---|---|---|
| 2021/0302872 | A1 | 9/2021 | Suzuki | | |
| 2022/0035292 | A1* | 2/2022 | Kishimoto | G03G 15/55 | |
| 2022/0171318 | A1* | 6/2022 | Kaigawa | G06F 3/1229 | |
| 2022/0334510 | A1* | 10/2022 | Sugiyama | G06F 3/1203 | |
| 2023/0018544 | A1* | 1/2023 | Yamamoto | H04N 1/00 | |
| 2023/0314997 | A1* | 10/2023 | Imanishi | G03G 21/1875 | 399/12 |

FOREIGN PATENT DOCUMENTS

| | | | |
|---|---|---|---|
| JP | 2021-196415 | A | 12/2021 |
| JP | 2002-342059 | A | 11/2022 |

* cited by examiner

IMAGE FORMING APPARATUS INCLUDING MAIN CASING TO WHICH CARTRIDGE IS ATTACHABLE AND MAIN MEMORY AND METHOD OF CONTROLLING IMAGE FORMING APPARATUS

REFERENCE TO RELATED APPLICATIONS

This application claims priority from Japanese Patent Application No. 2023-146342 filed on Sep. 8, 2023. The entire content of the priority application is incorporated herein by reference.

BACKGROUND ART

In recent years, cartridges for use in image forming apparatuses have been provided to users on a subscription basis. Japanese Patent Application Publication No. 2021-160229 describes a technology for providing a service of delivering subscription cartridges to users. Subscription cartridges cannot be used on an image forming apparatus in a normal state, i.e., an image forming apparatus for which a service contract has not been concluded.

Japanese Patent Application Publication No. 2021-160229 also describes a technology that enables a user to continue using subscription cartridges after the user has cancelled the service contract. Specifically, when the controller of an image forming apparatus receives a cancellation instruction to cancel a service contract, the controller executes a rewriting process to rewrite identification information specifying that the toner cartridges are subscription products with information specifying that the toner cartridges are normal products.

SUMMARY

Thus, the technology disclosed in Japanese Patent Application Publication No. 2021-160229 requires identification information in a toner memory of a subscription toner cartridge to be rewritten in order to allow the user to continue using the toner cartridge.

In view of the foregoing, it is an object of the present disclosure to provide a technology that allows a user to continue using subscription cartridges on an image forming apparatus after cancelling a service contract for the image forming apparatus without requiring the identification information stored in the toner memories of the toner cartridges to be rewritten.

In order to attain the above and other objects, according to one aspect, the present disclosure provides an image forming apparatus including: a main casing; a main memory; and a controller. A cartridge is detachably attachable to the main casing. The cartridge includes a cartridge memory storing therein identification information and type information. The identification information identifies the cartridge. The type information indicates whether the cartridge is a subscription cartridge or a normal cartridge. The subscription cartridge is permitted to be used while the image forming apparatus is in a subscribed state in which a service contract is in effect for the image forming apparatus. The normal cartridge is permitted to be used while the image forming apparatus is in both the subscribed state and a normal state in which the service contract is not in effect. The main memory is configured to store therein history information. The history information includes history identification information. The history identification information is identification information for a previous subscription cartridge. The previous subscription cartridge is the subscription cartridge previously attached to the main casing. The controller is configured to perform: (a) reading. The controller performs, in response to a cartridge being attached to the main casing, the reading in (a). The reading in (a) reads identification information from a cartridge memory of the attached cartridge as current identification information. The controller is configured to further perform, after receiving a cancellation instruction for placing the image forming apparatus in the normal state: (b) determining; and (c) permitting. The determining in (b) determines whether the current identification information read in (a) matches the history identification information included in the history information stored in the main memory. The controller performs, in response to determining in (b) that the current identification information matches the history identification information, the permitting in (c). The permitting in (c) permits use of the attached cartridge.

According to another aspect, the present disclosure also provides a method of controlling an image forming apparatus. The image forming apparatus includes: a main casing; and a main memory. A cartridge is detachably attachable to the main casing. The cartridge includes a cartridge memory storing therein identification information and type information. The identification information identifies the cartridge. The type information indicates whether the cartridge is a subscription cartridge or a normal cartridge. The subscription cartridge is permitted to be used while the image forming apparatus is in a subscribed state in which a service contract is in effect for the image forming apparatus. The normal cartridge is permitted to be used while the image forming apparatus is in both the subscribed state and a normal state in which the service contract is not in effect. The main memory is configured to store therein history information. The history information includes history identification information. The history identification information is identification information for a previous subscription cartridge. The previous subscription cartridge is the subscription cartridge previously attached to the main casing. The method comprising: (a) reading; (b) determining; and (c) permitting. In the method, the reading in (a) is performed in response to a cartridge is attached to the main casing. The reading in (a) reads identification information form a cartridge memory of the attached cartridge as current identification information. In the method, the determining in (b) is performed after a cancellation instruction for placing the image forming apparatus in the normal state is received. The determining in (b) determines whether the current identification information read in (a) matches the history identification information included in the history information. In the method, the permitting in (c) is performed in response to determining in (b) that the current identification information matches the history identification information. The permitting in (c) permits use of the attached cartridge.

According to the configuration described above, even after the image forming apparatus is placed in a normal state in which a service contract which has been concluded for the image forming apparatus is not in effect, cartridges which have been used under the service contract can continue to be used in the image forming apparatus.

DESCRIPTION

Figure 1:
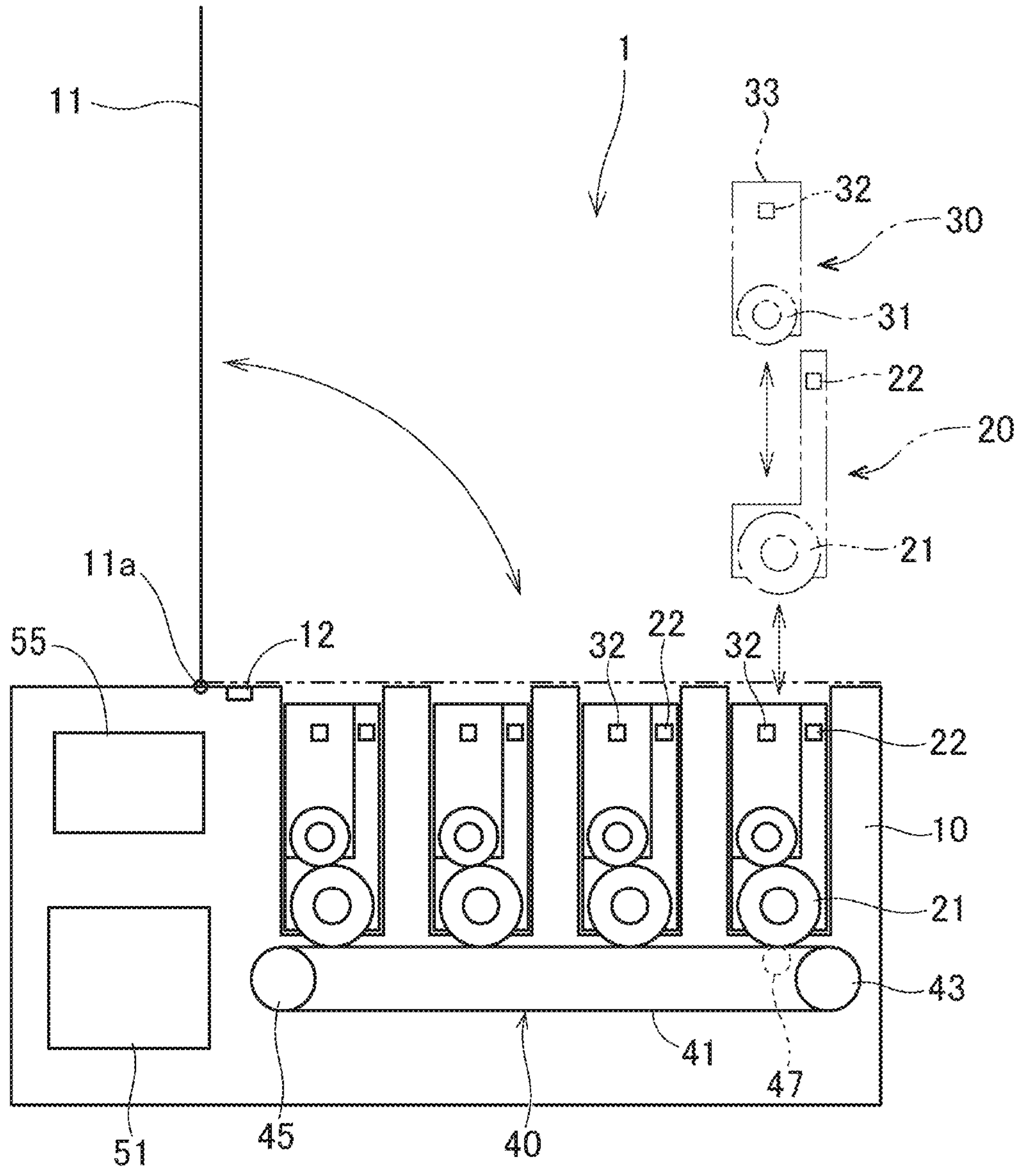
FIG. 1 is a diagram illustrating the configuration of an image forming apparatus.

Hereinafter, embodiments of the present disclosure will be described while referring to the accompanying drawings. The components described in these embodiments are merely examples, and the scope of the present disclosure is not intended to be limited to these examples. The dimensions and numbers of parts depicted in the drawings may be simplified as necessary for facilitating understanding.

1. First Embodiment

FIG. 1 illustrates the configuration of an image forming apparatus 1 according to a first embodiment. The image forming apparatus 1 is an electrophotographic printer, such as an LED printer. The image forming apparatus 1 includes a main casing 10, a cover 11, four drum cartridges 20, four toner cartridges 30, four LED units (not illustrated), a transfer unit 40, a control unit 51, and a display 55.

The main casing 10 has a rectangular box shape. The four drum cartridges 20, four toner cartridges 30, transfer unit 40, and control unit 51 are accommodated in the main casing 10. The drum cartridges 20 and toner cartridges 30 can be attached to and detached from the main casing 10 and can be replaced. The display 55 is positioned on an outer surface of the main casing 10. The main casing 10 has a frame that holds the four drum cartridges 20.

The cover 11 is rotatable between an open position depicted with a solid line in FIG. 1 and a closed position depicted with a two-dot chain line in FIG. 1 about a rotational axis 11*a* extending in a first direction. The first direction extends along the rotational axis of a photosensitive drum 21 described later. A sensor 12 is provided in the main casing 10. The sensor 12 is electrically connected to the control unit 51. The sensor 12 transmits a signal to the control unit 51 indicating that the movement of the cover 11 between the closed position and the open position is detected.

The four drum cartridges 20 all have the same configuration. Therefore, just one of the drum cartridges 20 will be described below.

The drum cartridge 20 has a photosensitive drum 21, a drum memory 22, and a drum frame.

The photosensitive drum 21 is a cylindrical member extending in the first direction. The photosensitive drum 21 is rotatable about a drum axis extending in the first direction.

The drum memory 22 is flash read-only memory (flash ROM) or electrically erasable programmable read-only memory (EEPROM), for example. The drum memory 22 stores therein information on the drum cartridge 20 to which the drum memory 22 is attached.

One toner cartridge 30 is detachably attached to the drum frame. The drum cartridge 20 is attached to the main casing 10 in a state where the one toner cartridge 30 is attached to the drum frame.

The four toner cartridges 30 all have the same configuration. Therefore, just one of the toner cartridges 30 will be described below.

The toner cartridge 30 includes a developing roller 31, a toner memory 32, and a casing 33.

The developing roller 31 is a cylindrical member that extends in the first direction. The developing roller 31 is rotatable about a developing roller axis extending in the first direction.

The toner memory 32 is a storage medium that permits reading information therefrom and writing information thereto. Specifically, the toner memory 32 is flash ROM or EEPROM. The toner memory 32 stores therein information on the toner cartridge 30 to which the toner memory 32 is attached. The casings 33 of the four toner cartridges 30 accommodate therein toner in mutually different colors (e.g., one of the colors cyan, magenta, yellow, and black).

The drum cartridge 20, to which the toner cartridge 30 is attached, is attached to the main casing 10 while the cover 11 is in the open position. The drum cartridge 20, to which the toner cartridge 30 is attached, is inserted into the main casing 10 through an opening in the main casing 10.

The four LED units all have the same configuration. Therefore, just one of the LED units will be described below.

The LED unit is attached to the inner surface of the cover 11. When the drum cartridge 20 is attached to the main casing 10 and the cover 11 is in the closed position, the LED unit faces the surface of a corresponding photosensitive drum 21. The LED unit can irradiate light onto the outer circumferential surface of the photosensitive drum 21. The light source of the LED unit is a light-emitting diode (LED). However, a laser unit with a single light source may be used in place of the LED units.

The transfer unit 40 has a transfer belt 41, a drive roller 43, a follow roller 45, and four transfer rollers 47.

The transfer belt 41 has an annular shape (an endless belt). The outer circumferential surfaces of the photosensitive drums 21 can contact the outer surface of the transfer belt 41. The transfer belt 41 is stretched around the drive roller 43 and the follow roller 45. The control unit 51 circulates the transfer belt 41 by driving the drive roller 43. The follow roller 45 rotates in accordance with the circulating movement of the transfer belt 41 driven by the drive roller 43.

The four transfer rollers 47 are positioned in the space formed inside the annular transfer belt 41. The four transfer rollers 47 all have the same configuration. Therefore, just one of the transfer rollers 47 will be described below.

The transfer roller 47 has a cylindrical shape that is elongated in the first direction. The transfer roller 47 is rotatable about a rotational axis extending in the first direction. The outer circumferential surface of the transfer roller 47 is formed of a conductive rubber, for example. A transfer bias is applied to the transfer roller 47.

The transfer roller 47 is positioned beneath the corresponding photosensitive drum 21. The transfer belt 41 is interposed between the photosensitive drum 21 and the transfer roller 47. When a transfer bias is applied to the outer circumferential surface of the transfer roller 47, toner deposited on the outer surface of the photosensitive drum 21 moves in a direction toward the transfer belt 41. The toner moved in the direction toward the transfer belt 41 is transferred onto printing paper through a transfer mechanism (not illustrated), thereby forming an image on the printing paper.

When a printing process is performed on the image forming apparatus 1, the entire surface of the photosensitive drum 21 of each drum cartridge 20 is uniformly charged. The LED units irradiate LED light onto the corresponding photosensitive drums 21 in accordance with the image being printed. The developing rollers 31 then deposit toner onto the surfaces of the corresponding photosensitive drums 21 exposed by the LED units. The transfer unit 40 further transfers the toner deposited on the photosensitive drums 21 to the printing paper. Toner transferred onto the printing paper is heated by a thermal fixing unit (not illustrated) and is fixed to the printing paper.

Figure 2:
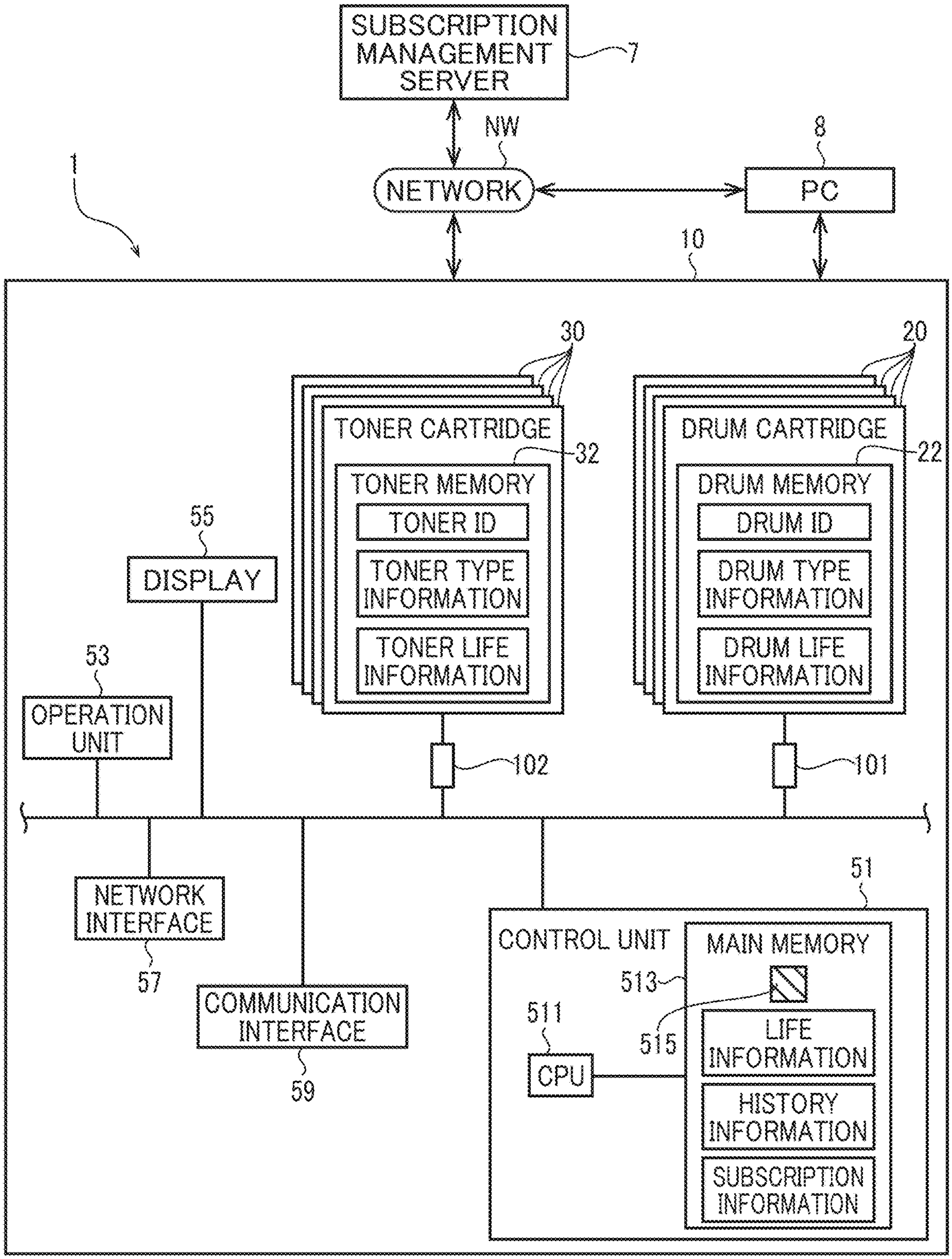
FIG. 2 is a block diagram illustrating the electrical connection between a control unit and other components in the image forming apparatus.

FIG. 2 is a block diagram illustrating the configuration of the image forming apparatus 1 according to the first embodiment. The image forming apparatus 1 has the control unit 51, an operation unit 53, the display 55, a network interface 57, and a communication interface 59.

The control unit 51 has a CPU 511 as a processor, and a main memory 513.

The main memory 513 is a storage medium that permits reading information therefrom and writing information thereto. The main memory 513 is flash ROM or EEPROM, for example. The main memory 513 stores a program 515.

The control unit 51 implements various processes with the CPU 511 executing the program 515.

The control unit 51 may be configured of an application-specific integrated circuit (ASIC) or other dedicated circuit.

The operation unit 53 includes buttons that receive user operations.

The display 55 displays various display information. Note that the display 55 may have a touchscreen in order to function also as the operation unit 53.

The network interface 57 is connected to a subscription management server 7 via a network NW. A local area network (LAN) cable is connected to the network interface 57, for example. When a LAN cable is connected to the network interface 57, the control unit 51 can communicate with the subscription management server 7 via the network interface 57 and the network NW. The network interface 57 may also be connected to the network NW through wireless LAN or other wireless communication.

A communication cable, such as a Universal Serial Bus (USB) cable, is connected to the communication interface 59. When the communication cable is connected to the communication interface 59, the control unit 51 can receive print jobs from a personal computer (PC) 8 via the communication interface 59 and the communication cable. Aprint job is a print instruction instructing the image forming apparatus 1 to perform printing. The control unit 51 may also be connected to the PC 8 through wireless communication, such as Bluetooth (registered trademark) or wireless LAN. "Bluetooth" is a Japanese registered trademark of Bluetooth SIG, Incorporated.

The PC 8 is connected to the subscription management server 7 via the network NW. A LAN cable is connected to the PC 8, for example. When a LAN cable is connected to the PC 8, the PC 8 can communicate with the subscription management server 7 via the network NW. The PC 8 may also be connected to the network NW through wireless LAN or other wireless communication. The processes performed on the PC 8 may also be executed by a portable terminal, such as a smartphone.

When the user wishes to enter a service contract for the image forming apparatus 1, the user connects the PC 8 to the subscription management server 7 and enters the contract through operations on the PC 8. As a result, the subscription management server 7 transmits a subscription instruction to the image forming apparatus 1 to conclude the service contract with the image forming apparatus 1, make the service contract for the image forming apparatus 1 in effect and place the image forming apparatus 1 in a subscribed state. Upon receiving this subscription instruction from the subscription management server 7, the image forming apparatus 1 enters the subscribed state. To cancel a service contract for the image forming apparatus 1, the user connects the PC 8 to the subscription management server 7 and cancels the contract through operations on the PC 8. In response, the subscription management server 7 transmits a cancellation instruction to the image forming apparatus 1 to cancel the service contract with the image forming apparatus 1, make the service contract for the image forming apparatus 1 not in effect, and place the image forming apparatus 1 in a state in which the contract has been not in effect (i.e., a normal state). Upon receiving a cancellation instruction from the subscription management server 7, the image forming apparatus 1 enters the normal state.

As illustrated in FIG. 2, the main casing 10 has connectors 101 and connectors 102. When each drum cartridge 20 is attached to the main casing 10, the corresponding connector 101 becomes electrically connected to the drum memory 22 of the attached drum cartridge 20, electrically connecting the control unit 51 to the drum memory 22. As a result, the control unit 51 can execute a reading process to read information from the drum memory 22 and a writing process to write information to the drum memory 22. Also, when each drum cartridge 20 to which a toner cartridge 30 is attached is attached to the main casing 10, the corresponding connector 102 becomes electrically connected to the toner memory 32 of the toner cartridge 30 which is attached to the attached drum cartridge 20, electrically connecting the control unit 51 to the toner memory 32. As a result, the control unit 51 can execute a reading process to read information from the toner memory 32 and a writing process to write information to the toner memory 32.

The drum memory 22 stores therein a drum ID, drum life information, and drum type information, for example.

The drum ID is a unique serial number for identifying an individual drum cartridge 20.

The drum life information is at least one of a cumulative number of rotations of the photosensitive drum 21 and a cumulative number of sheets printed using the photosensitive drum 21, for example. The cumulative number of rotations of the photosensitive drum 21 and the cumulative number of sheets printed using the photosensitive drum 21 are incremented or decremented for the drum cartridge 20 identified by the drum ID each time printing is performed.

The drum type information is an example of the type information. The drum type information indicates whether the drum cartridge 20 is a subscription product or a normal product. Subscription products can be used when the image forming apparatus 1 is in a subscribed state in which a service contract has been concluded for the image forming apparatus 1 and is in effect for the image forming apparatus 1, and cannot be used when the image forming apparatus 1 is in a normal state in which a service contract has not been concluded for the image forming apparatus 1 or has been cancelled for the image forming apparatus 1 and is not in effect for the image forming apparatus 1. Normal products can be used when the image forming apparatus 1 is in either a subscribed state or a normal state.

Under the service contract, subscription drum cartridges 20 are automatically delivered to the user on the basis of the life information and the like stored in the main memory 513, for example. Thus, the service enables the user to use subscription drum cartridges 20.

The toner memory 32 stores therein a toner ID, toner life information, and toner type information, for example.

The toner ID is a unique serial number for identifying an individual toner cartridge 30.

The toner life information is at least one of a cumulative number of rotations of the developing roller 31, a cumulative number of sheets printed using the developing roller 31, and a cumulative number of dots formed using the developing roller 31, for example.

The cumulative number of rotations of the developing roller 31 is incremented or decremented for the single toner cartridge 30 identified by the toner ID each time printing is performed. The cumulative number of sheets printed using the developing roller 31 and the cumulative number of dots formed using the developing roller 31 are calculated similarly to the cumulative number of rotations of the developing roller 31.

The toner type information is an example of the type information. The toner type information indicates whether the toner cartridge 30 is a subscription product or a normal product. The meaning of "subscription product" and "normal product" when identifying toner cartridges 30 is the same as when identifying drum cartridges 20.

The main memory 513 stores therein history information, subscription information, and life information.

History information includes history information for each drum cartridge 20 and history information for each toner cartridge 30. In other words, the main memory 513 stores four sets of history information for drum cartridges 20 and four sets of history information for toner cartridges 30. The history information for a drum cartridge 20 may include the drum ID read from the drum memory 22 of the drum cartridge 20, and the history information for a toner cartridge 30 may include the toner ID read from the toner memory 32 of the toner cartridge 30. Specifically, the history information for a toner cartridge 30 accommodating toner of a specific color includes toner IDs read from toner memories 32 of subscription toner cartridges 30 accommodating toner of the specific color that have been attached to the main casing 10 and have been used on the image forming apparatus 1 in the subscribed state. Each of the drum IDs and the toner IDs included in the history information is an example of the history identification information of the present disclosure.

The subscription information is information indicating whether the image forming apparatus 1 is in a subscribed state or a normal state in which no contract is concluded. In other words, in the normal state, no contract has been concluded or a previously concluded contract has been cancelled, i.e., the contract is not in effect for the image forming apparatus 1. When the control unit 51 receives a subscription instruction from the subscription management server 7, the control unit 51 changes the subscription information by changing the value of a flag to indicate a subscribed state. When the control unit 51 receives a cancellation instruction from the subscription management server 7, the control unit 51 changes the subscription information by changing the value of the flag to indicate a normal state.

The life information includes drum life information for each drum cartridge 20 and toner life information for each toner cartridge 30. The drum life information for a drum cartridge 20 stored in the main memory 513 is identical to the drum life information stored in the drum memory 22 of the drum cartridge 20. The toner life information for a toner cartridge 30 stored in the main memory 513 is also identical to the toner life information stored in the toner memory 32 of the toner cartridge 30. The main memory 513 may also store a printer ID. The printer ID is identification information, such as a serial number, for identifying an individual image forming apparatus 1.

Description of Operations

Next, various processes executed by the control unit 51 will be described. The following describes the flow of steps in a process related to information stored in each toner memory 32. Since process related to information stored in the drum memories 22 are similar to processes related to information stored in the toner memories 32, the description of the former processes will be omitted.

Figure 3:
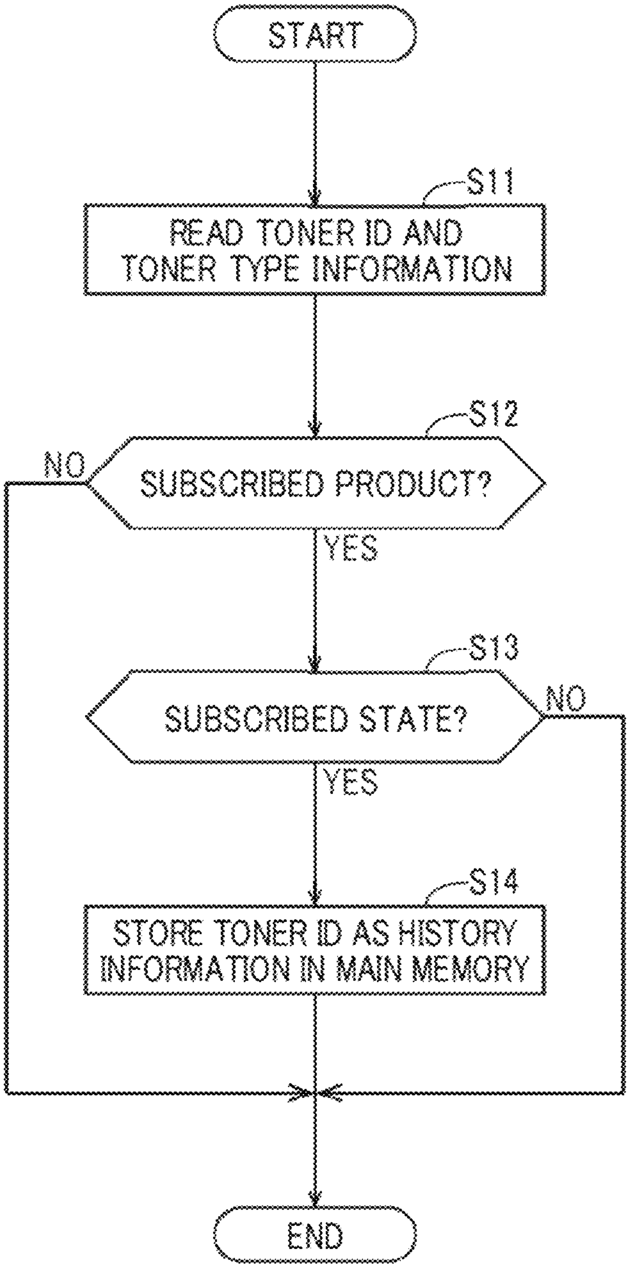
FIG. 3 is a flowchart illustrating steps in a history information storage process executed by the control unit.

FIG. 3 is a flowchart illustrating steps in a history information storage process executed by the control unit 51 in the first embodiment. In this history information storage process, the toner IDs of toner cartridges 30 attached to the main casing 10 are stored in the main memory 513 as history information for respective toner cartridges 30. The control unit 51 executes the history information storage process when the service contract is concluded for the first time and the toner cartridges 30 are attached to the main casing 10, for example. Specifically, when the sensor 12 detects the cover 11 moving between the closed position and the open position or when the control unit 51 detects that the power to the image forming apparatus 1 is switched from OFF to ON after the service contract was concluded for the image forming apparatus 1 for the first time, the control unit 51 executes the history information storage process. Although not specifically indicated, each process described herein is performed for all toner cartridges 30 and drum cartridges 20. The description below details the process for one toner cartridge 30 accommodating toner of a specific color only.

In S11 the control unit 51 reads the toner ID and toner type information of a toner cartridge 30 attached to the main casing 10 from the toner memory 32 of the toner cartridge 30 (reading process).

In S12 the control unit 51 determines whether the toner type information read in the reading process of S11 indicates that the toner cartridge 30 is a subscription product or a normal product (type identification process).

When the toner type information indicates that the toner cartridge 30 is a normal product (S12: NO) in the type identification process, the control unit 51 ends the history information storage process.

However, when the toner type information indicates that the toner cartridge 30 is a subscription product (S12: YES) in the type identification process, in S13 the control unit 51 references the subscription information recorded in the main memory 513 to determine whether the image forming apparatus 1 is in a subscribed state (subscription determination process).

When the image forming apparatus 1 is in a subscribed state (S13: YES) in the subscription determination process, in S14 the control unit 51 stores the toner ID in the main memory 513 as history information (storage process). Specifically, in the storage process of S14, the control unit 51 stores the toner ID in the main memory 513 as history information for the specific color of toner accommodated in the toner cartridge 30.

However, when the image forming apparatus 1 is not in a subscribed state (S13: NO) in the subscription determination process, the control unit 51 skips the storage process of S14. Through the above process, the control unit 51 of an image forming apparatus 1 in a subscribed state stores toner IDs for toner cartridges 30 attached to the image forming apparatus 1 in the main memory 513 as history information.

Figure 4:
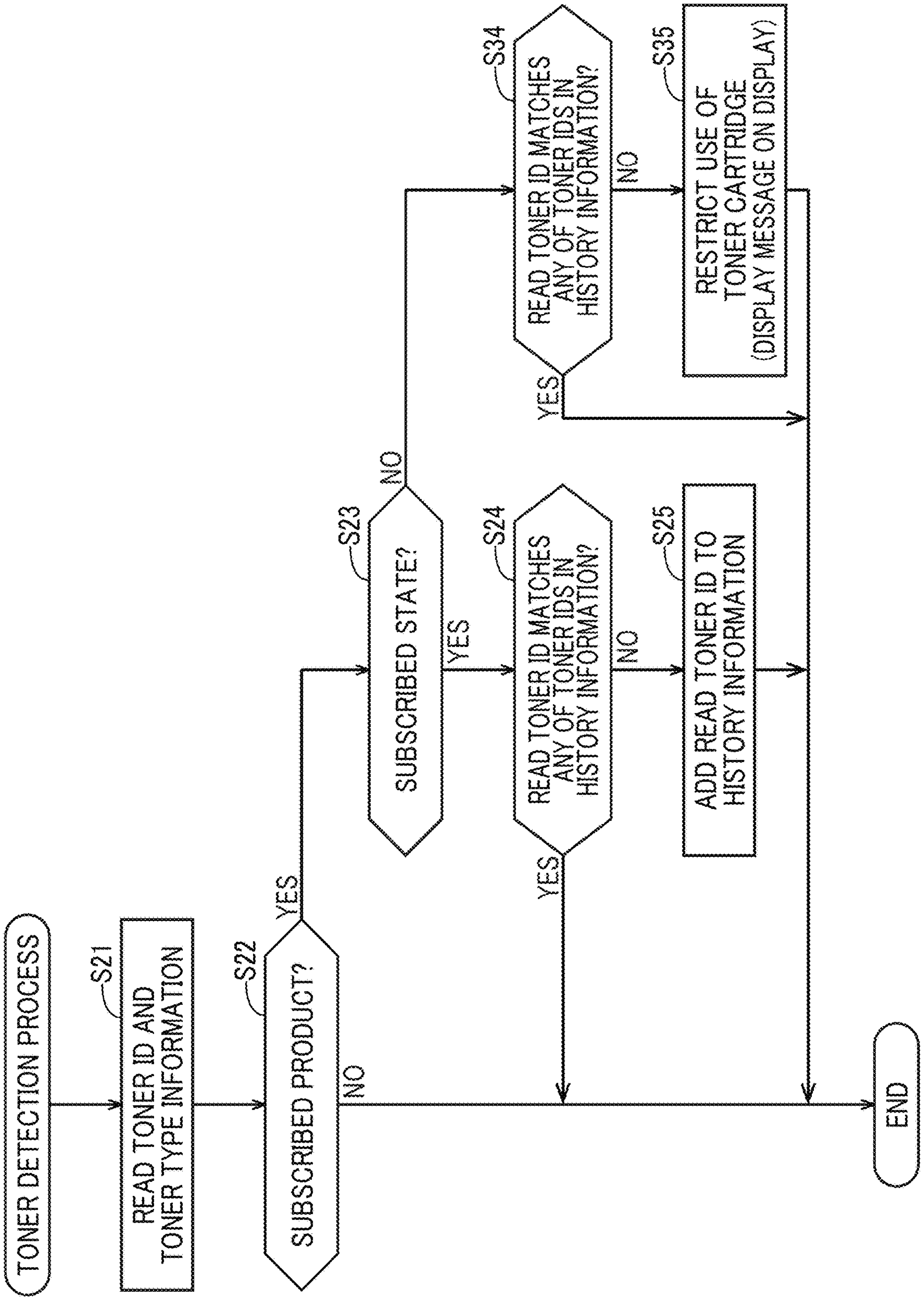
FIG. 4 is a flowchart illustrating steps in a toner detection process executed by the control unit.

FIG. 4 is a flowchart illustrating steps in a toner detection process executed by the control unit 51 in the first embodiment. In this toner detection process, the toner ID of a subscription toner cartridge 30 attached to the main casing 10 for the first time while the image forming apparatus 1 is in a subscribed state is added to the history information for the toner cartridge 30 that has already been stored in the main memory 513. The control unit 51 executes the toner detection process when there is a possibility that one or more of the toner cartridges 30 are replaced, for example. Specifically, when the sensor 12 detects the cover 11 moving between the closed position and the open position or when the control unit 51 detects that the power to the image forming apparatus 1 is switched from OFF to ON, the control unit 51 executes the toner detection process.

In S21 at the beginning of this process, the control unit 51 reads the toner ID and toner type information of a toner cartridge 30 attached to the main casing 10 from the toner memory 32 of the toner cartridge 30 (reading process).

In S22 the control unit 51 determines whether the toner type information read in the reading process of S21 indicates that the toner cartridge 30 is a subscription product or a normal product (type identification process).

When the toner type information indicates that the toner cartridge 30 is a normal product (S22: NO) in the type identification process, the control unit 51 ends the toner detection process.

However, when the toner type information indicates that the toner cartridge 30 is a subscription product (S22: YES) in the type identification process, in S23 the control unit 51 references the subscription information recorded in the main memory 513 to determine whether the image forming apparatus 1 is in a subscribed state (subscription determination process).

When the image forming apparatus 1 is in a subscribed state (S23: YES) in the subscription determination process, in S24 the control unit 51 determines whether the toner ID read in the reading process of S21 matches any of toner IDs included in the corresponding history information stored in the main memory 513 (history determination process).

When the toner cartridge 30 is attached to the main casing 10 for the first time, i.e., when the toner ID of this toner cartridge 30 is not included in the history information stored in the main memory 513, the control unit 51 determines that the toner ID read in the reading process of S11 does not match any of toner IDs included in the history information stored in the main memory 513 (S24: NO) in the history determination process, and in S25 the control unit 51 stores the toner ID in the main memory 513 as history information for the color of toner accommodated in the toner cartridge 30 (storage process). Specifically, in the storage process of S15, the control unit 51 adds the toner ID to the history information for the color of toner accommodated in the toner cartridge 30 that has already been stored in the main memory 513.

However, when the control unit 51 determines that the toner ID read in the reading process of S21 matches one of the toner IDs included in the history information stored in the main memory 513 (S24: YES) in the history determination process, the control unit 51 skips the storage process of S25 and ends the toner detection process. At this time, the control unit 51 may execute a permission process to permit use of the toner cartridge 30 as described later. When the image forming apparatus 1 is not in a subscribed state (S23: NO) in the subscription determination process, the control unit 51 also skips the storage process of S25. The process performed when the image forming apparatus 1 is in a normal state will be described later.

Through the above process, the control unit 51 of an image forming apparatus 1 in a subscribed state stores toner IDs for toner cartridges 30 that are attached for the first time to the image forming apparatus 1 in the main memory 513 as history information.

When the image forming apparatus 1 is not in a subscribed state (S23: NO) in the subscription determination process, in S34 the control unit 51 determines whether the toner ID read in the reading process of S21 matches any of toner IDs included in the corresponding history information stored in the main memory 513 (history determination process), similar to the process in S24.

When the toner ID matches one of the toner IDs included in the history information stored in the main memory 513 (S34: YES) in the history determination process, the control unit 51 ends the toner detection process. At this time, the control unit 51 may execute a permission process to permit use of the toner cartridge 30. For example, the control unit 51 may store a permission flag in the main memory 513 in this permission process indicating that printing performed using this toner cartridge 30 is permitted. During subsequent printing processes, the control unit 51 can then determine whether to perform printing on the basis of the presence or absence of a permission flag.

On the other hand, when the toner ID does not match any of the toner IDs included in the history information stored in the main memory 513 (S34: NO) in the history determination process, in S35 the control unit 51 restricts use of the toner cartridge 30 (restriction process). For example, the control unit 51 may display a message on the display 55 in the restriction process of S35 indicating that use of the toner cartridge 30 is restricted. The message may be a message warning the user that the toner cartridge 30 attached to the image forming apparatus 1 is not authorized and may be a message prompting the user to replace this toner cartridge 30 with an appropriate toner cartridge 30, for example.

As described above, when the service contract is concluded for the image forming apparatus 1 for the first time and a toner cartridge 30 is attached to the main casing 10, the control unit 51 of the first embodiment executes the reading process of S11 to read the toner ID for a toner cartridge 30 attached to the main casing 10 from the toner memory 32 of the attached toner cartridge 30, and the storage process of S14 to store the toner ID read in S11 in the main memory 513 as history information. When the control unit 51 then receives a cancellation instruction to cancel the service contract with the image forming apparatus 1 after the reading process of S11 and the storage process of S14 are performed and in a state where the history information is stored in the main memory 513, the control unit 51 reads, in response to a toner cartridge 30 being attached to the main casing 10, the toner ID for the attached toner cartridge 30 from the toner memory 32 of the attached toner cartridge 30 in the reading process of S21, determines in the subscription determination process of S23 that the image forming apparatus 1 is not in a subscribed state, and executes the history determination process in S34. In S34 the control unit 51 determines whether the toner ID of the toner cartridge 30 matches any of toner IDs included in the corresponding history information. When the control unit 51 determines in S34 that the toner ID matches one of the toner IDs included in the history information, the control unit 51 permits use of the toner cartridge 30. With this configuration, subscription toner cartridges that have been used under a service contract previously concluded for one image forming apparatus can continue to be used on the same image forming apparatus after the service contract for the image forming apparatus is cancelled.

However, when subscription toner cartridges 30 used on one image forming apparatus 1 are attached to another image forming apparatus 1, those toner cartridges 30 cannot be used on the other image forming apparatus 1 because the toner IDs for the toner cartridges 30 are not included in the corresponding history information stored in the main memory 513 of the other image forming apparatus 1. Accordingly, this configuration avoids the unauthorized use of subscription toner cartridges 30.

Further, in the reading process of S21 the control unit 51 reads toner type information for a toner cartridge 30 attached to the main casing 10 from the toner memory 32 of the attached toner cartridge 30. The control unit 51 then executes the type identification process of S22 to determine whether the toner type information read in S21 indicates that the toner cartridge 30 is a subscription product or a normal product. When executing the history determination process of S24 or S34 after determining in the type identification process of S22 that the toner type information for the toner cartridge 30 indicates that the toner cartridge 30 is a subscription product, the control unit 51 permits use of the toner cartridge 30 upon determining that the toner ID for the toner cartridge 30 matches one of the toner IDs included in the corresponding history information.

When the control unit 51 determines in the history determination process of S34 that the toner ID stored in the toner memory 32 of the toner cartridge 30 does not match any of the toner IDs included in the history information, the control unit 51 executes the restriction process of S35 to restrict use of this toner cartridge 30. This configuration can restrict the user from using subscription toner cartridges that were not previously used under the service contract when the service contract for the image forming apparatus 1 has been cancelled and is no longer in effect.

In the history determination process of S34 according to the present embodiment, the control unit 51 determine whether the toner ID read in the reading process of S21 matches any of the information (toner IDs) included in the corresponding history information. Alternatively, the control unit 51 may determine in the history determination process of S34 whether the toner ID read in the reading process of S21 matches the most recently added information (toner ID) among all information (toner IDs) included in the corresponding history information. In this case, the control unit 51 can restrict use of toner cartridges 30 other than the most recently attached subscription toner cartridges 30. Alternatively, the control unit 51 may determine in the history determination process of S34 whether the toner ID read in the reading process of S21 matches any of a prescribed number of sets of information (toner IDs) selected according to a prescribed order from the most recently added information (toner ID) among all information (toner IDs) included in the corresponding history information. Here, the prescribed order is opposite to the addition order in which all sets of information (toner IDs) included in the history information have been added to the history information.

2. Second Embodiment

Figure 6:
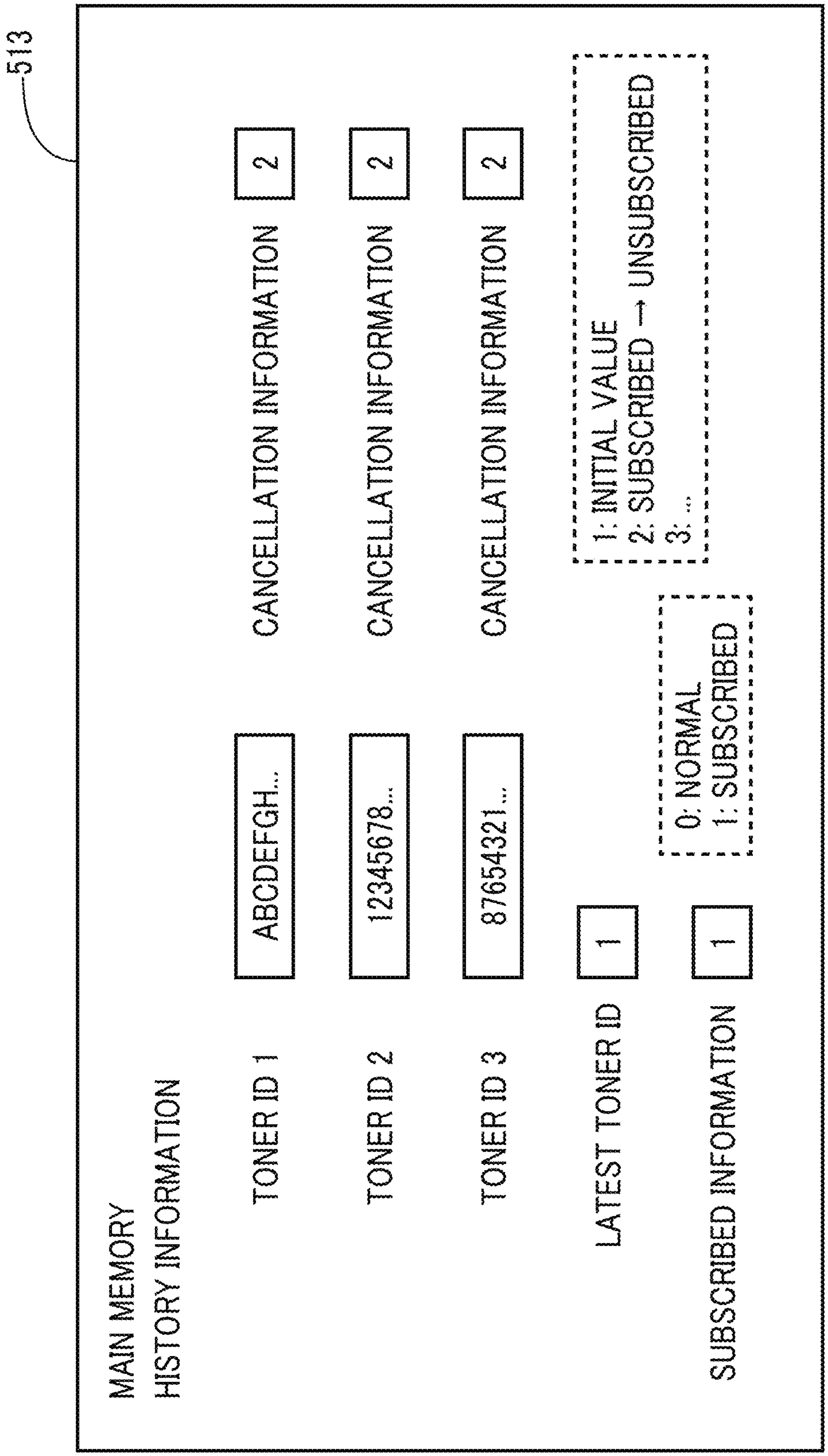
FIG. 6 is a diagram illustrating the content of a main memory in the image forming apparatus.

FIG. 6 is a diagram illustrating the content of the history information stored in the main memory 513 of the image forming apparatus 1 according to the second embodiment. In the example illustrated in FIG. 6, the main memory 513 stores therein history information including three toner IDs as history information for a toner cartridge 30 accommodating toner of a single specific color. The number of toner IDs included in the history information may be two or less, or four or more. In the example of FIG. 6, a unique integer is assigned to each toner ID stored as the history information, with each number being different from the others.

The main memory 513 also stores therein latest toner ID information.

The latest toner ID information is included in the history information for each drum cartridge 20 and the history information for each toner cartridge 30. The latest toner ID information included in the history information for a toner cartridge 30 specifies the toner ID most recently added to the history information for the toner cartridge 30. In the example of FIG. 6, the latest toner ID information is one of numbers assigned to the toner IDs included in the history information.

Note that when there is restriction on the number of toner IDs that can be included in the history information and there is no space in the storage area for storing all the toner IDs, a ring buffer may be used. For example, the control unit 51 may overwrite toner IDs in order from the oldest toner ID.

The main memory 513 stores therein history information including a cancellation information flag in association with each toner ID included therein. The cancellation information flag has an initial value of "1".

Figure 5:
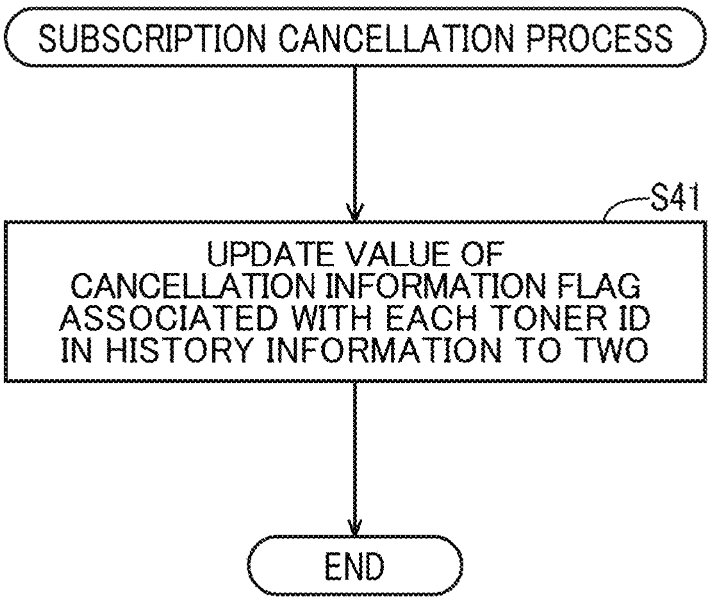
FIG. 5 is a flowchart illustrating steps in a subscription cancellation process executed by the control unit.

FIG. 5 is a flowchart illustrating steps in a subscription cancellation process executed by the control unit 51 in a second embodiment. The control unit 51 may perform the subscription cancellation process illustrated in FIG. 5 either immediately after receiving a cancellation instruction from the subscription management server 7 or when a fixed time has elapsed after receiving a cancellation instruction from the subscription management server 7.

In S41 of the subscription cancellation process, the control unit 51 updates a value of a cancellation information flag associated with each toner ID included in the history information to "2" (association process). Thus, the cancellation information flag having the value of "2" is an example of the cancellation information.

Cancellation information is information indicating that the contract has been cancelled and is not in effect. The control unit 51 assigns cancellation information to each toner ID included in the history information. After completing the association process in S41, the control unit 51 ends the process of FIG. 5.

Figure 7:
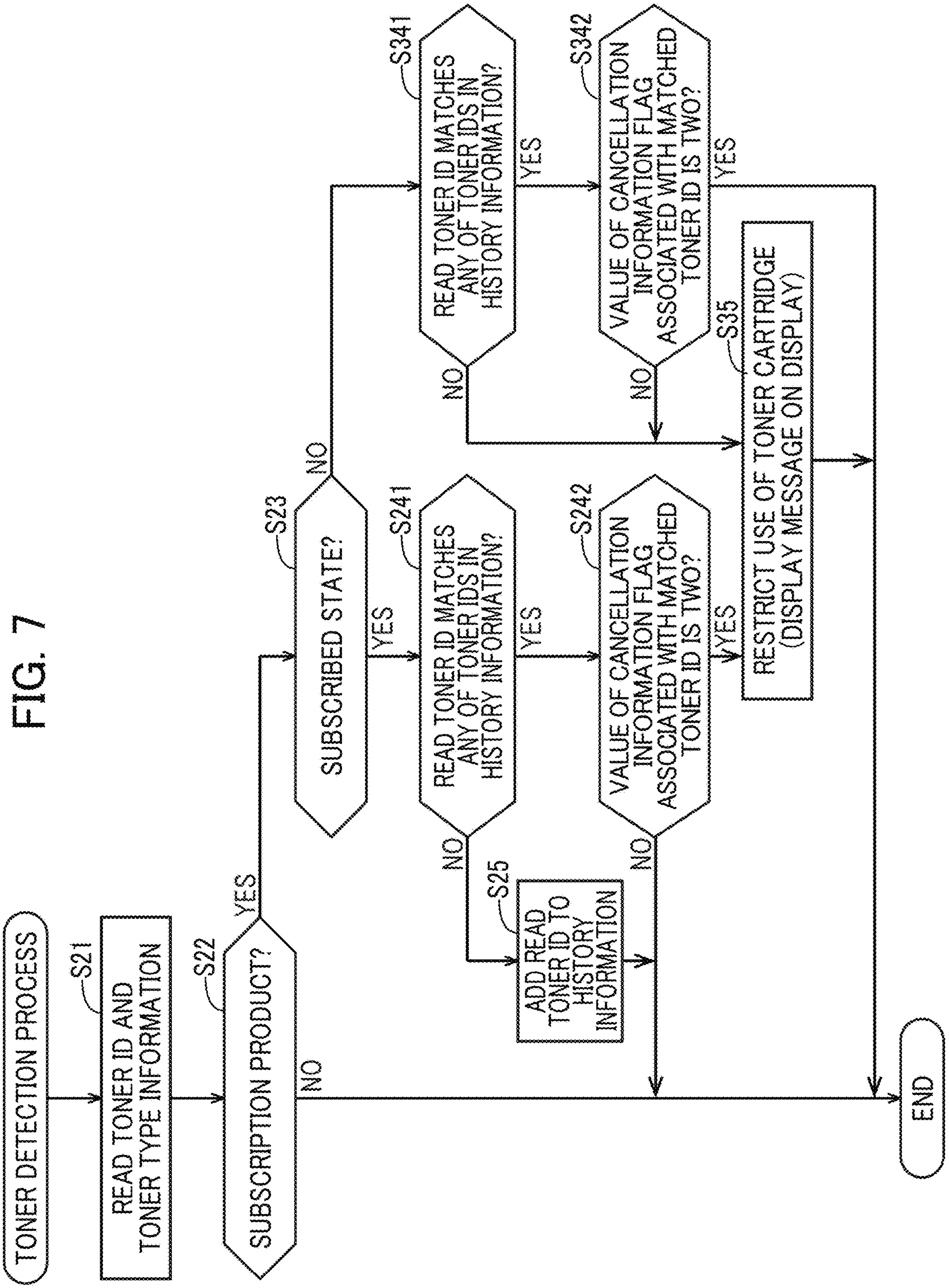
FIG. 7 is a flowchart illustrating steps in a toner detection process executed by the control unit.

FIG. 7 is a flowchart illustrating steps in the toner detection process executed by the control unit 51 in the second embodiment. Next, the toner detection process will be described with reference to FIG. 7, while descriptions will be omitted for steps identical to those in the toner detection process illustrated in FIG. 4.

In the second embodiment, when the control unit 51 determines in the subscription determination process of S23 that the image forming apparatus 1 is in a subscribed state (S23: YES), in S241 the control unit 51 determines whether the toner ID read in the reading process of S21 matches any of toner IDs included in the corresponding history information (history determination process).

When the toner ID matches one of the toner IDs included in the history information (S241: YES), in S242 the control unit 51 determines whether the value of a cancellation information flag associated with this toner ID in the history information is "2" indicating that the contract has been cancelled and is not in effect (association determination process). When the value of the cancellation information flag associated with the matched toner ID is "2" (S242: YES) in the association determination process, the control unit 51 executes the restriction process of S35.

On the other hand, when the toner ID does not match any of the toner IDs included in the history information (S241: NO), in S25 the control unit 51 adds the toner ID to the history information (storage process). In the second embodiment, the control unit 51 also stores a cancellation information flag having the initial value of "1" in the history information in association with the added toner ID. Subsequently, the control unit 51 ends the process in FIG. 7 without restricting use of the subscription toner cartridge 30. In other words, the control unit 51 permits use of the toner cartridge 30. The control unit 51 also ends the process in FIG. 7 even when the toner ID matches one of the toner IDs included in the corresponding history information (S241: YES) but the value of a cancellation information flag associated with this toner ID is not "2" (S242: NO). In other words, the control unit 51 permits use of the toner cartridge 30.

When the control unit 51 determines in the subscription determination process of S23 that the image forming apparatus 1 is in a normal state (S23: NO), in S341 the control unit 51 determines whether the toner ID matches any of toner IDs included in the corresponding history information (history determination process).

When the toner ID matches one of the toner IDs included in the history information (S341: YES), in S342 the control unit 51 determines whether the value of a cancellation information flag associated with this toner ID in the history information is "2" (association determination process).

When the value of the cancellation information flag associated with the matched toner ID in the history information is "2" (S342: YES), the control unit 51 skips the restriction process of S35 and ends the process in FIG. 7.

On the other hand, when the control unit 51 determines in the history determination process of S341 that the toner ID does not match any of the toner IDs included in the corresponding history information (S341: NO) or when the toner ID matches one of the toner IDs included in the corresponding history information (S341: YES) but the value of the cancellation information flag associated with the matched toner ID in the history information is not "2" (S342: NO), the control unit 51 executes the restriction process of S35.

As described above, when the image forming apparatus 1 receives a cancellation instruction in the second embodiment, the control unit 51 associates cancellation information (cancellation information flag having the value of "2") indicating that the service contract has been cancelled and is not in effect with each of toner IDs included in the history information in the association process of S41. The control unit 51 then determines, in response to a toner cartridge 30 being attached to the main casing 10, whether the toner ID of the attached toner cartridge 30 matches any of toner IDs included in the corresponding history information that has been associated with cancellation information in the history determination process of S341 and the association determination process of S342. With this configuration, when a service contract is once again established and is in effect for the image forming apparatus 1, the control unit 51 can distinguish between subscription toner cartridges 30 used under the previous contract and new subscription toner cartridges 30 used after a new contract was established on the basis of the cancellation information. Thus, the control unit 51 can effectively control whether the user can use subscription toner cartridges 30 that were provided under a previous contract.

When the image forming apparatus 1 receives, after receiving a cancellation instruction, another subscription instruction, i.e., when the image forming apparatus 1 is placed in a subscribed state again (resubscribed), the control unit 51 determines in the subscription determination process of S23 that the image forming apparatus 1 is in a subscribed state and executes the history determination process of S241. When the control unit 51 determines in the history determination process of S241 and the association determination process of S242 that the toner ID for the attached toner cartridge 30 matches one of toner IDs included in the corresponding history information, which is associated with cancellation information, the control unit 51 executes the restriction process of S35. In this way, when the image forming apparatus 1 is resubscribed, the control unit 51 can restrict the user from using subscription toner cartridges 30 that were provided under a previous contract.

However, even when each of the toner IDs included in the history information is associated with cancellation information in a case where the image forming apparatus 1 is resubscribed, the control unit 51 permits use of the toner cartridge 30 if the toner ID for the toner cartridge 30 does not match any of the toner IDs included in the history information in the history determination process (S241: NO). With this configuration, the user can use newly acquired subscription toner cartridges 30 without problem when the image forming apparatus 1 is resubscribed.

On the other hand, when the image forming apparatus 1 does not receive a subscription instruction after having received a cancellation instruction, i.e., when the image forming apparatus 1 is not placed in a subscribed state (not resubscribed), the control unit 51 determines in the subscription determination process of S23 that the image forming apparatus 1 is in a normal state and executes the history determination process of S341. When the control unit 51 determines in the history determination process of S341 and the association determination process of S342 that the toner ID for the attached toner cartridge 30 matches one of the toner IDs included in the corresponding history information, which is associated with cancellation information, the control unit 51 does not execute the restriction process of S35. On the other hand, when the control unit 51 determines in S341 and S342 that the toner ID of the attached toner cartridge 30 does not match any of the toner IDs included in the corresponding history information, or that the toner ID of the attached toner cartridge 30 matches one of the toner IDs included in the history information, which is not associated with cancellation information, the control unit 51 executes the restriction process of S35. With this configuration, the user can continue to use subscription toner cartridges that were provided under a previous service contract even when the image forming apparatus 1 has not been resubscribed.

3. Third Embodiment

Figure 8:
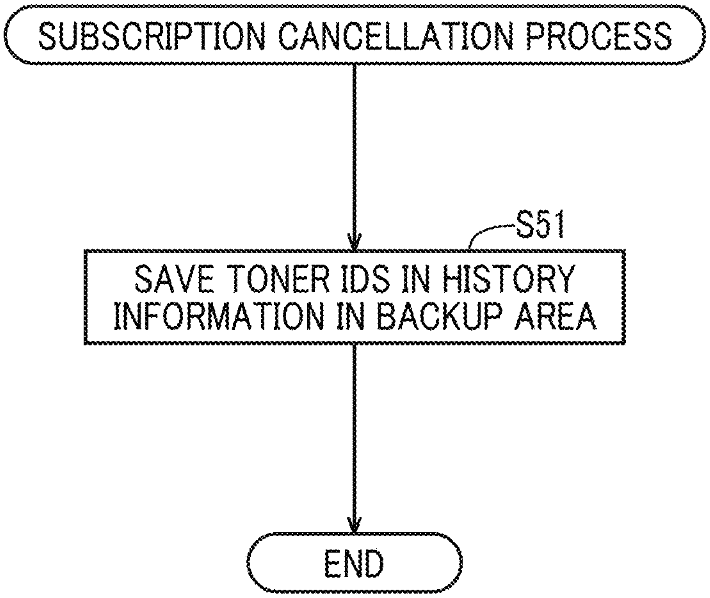
FIG. 8 is a flowchart illustrating steps in a subscription cancellation process executed by the control unit.

FIG. 8 is a flowchart illustrating steps in the subscription cancellation process executed by the control unit 51 in a third embodiment. The control unit 51 may execute the subscription cancellation process illustrated in FIG. 8 either immediately after receiving a cancellation instruction from the subscription management server 7 or when a fixed time has elapsed after receiving a cancellation instruction from the subscription management server 7. In S51 of the subscription cancellation process, the control unit 51 saves toner IDs included in the corresponding history information in a backup area 61 of the main memory 513 (backup process). After completing the backup process of S51, the control unit 51 ends the process in FIG. 8.

Figure 9:
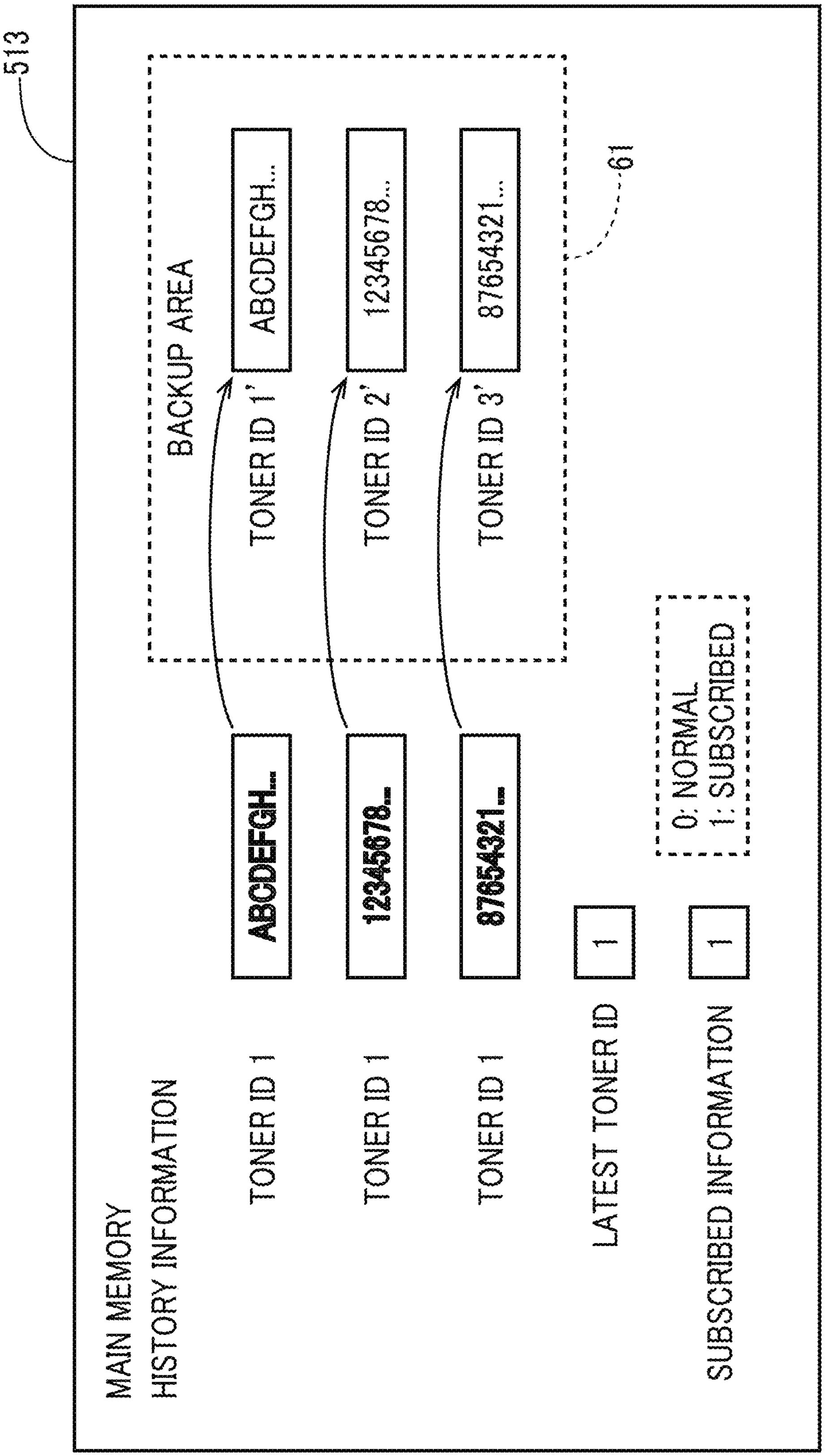
FIG. 9 is a diagram illustrating the content of the main memory in the image forming apparatus.

FIG. 9 is a diagram illustrating the content of the history information and the corresponding backup area 61 in the main memory 513 of the image forming apparatus 1 according to the third embodiment. As illustrated in FIG. 9, the main memory 513 has a backup area 61 corresponding to each set of the history information. In the backup process of S51, the control unit 51 saves the toner IDs included in the history information in the backup area 61. The original toner IDs included in the history information may be deleted at this time or maintained as is.

Figure 10:
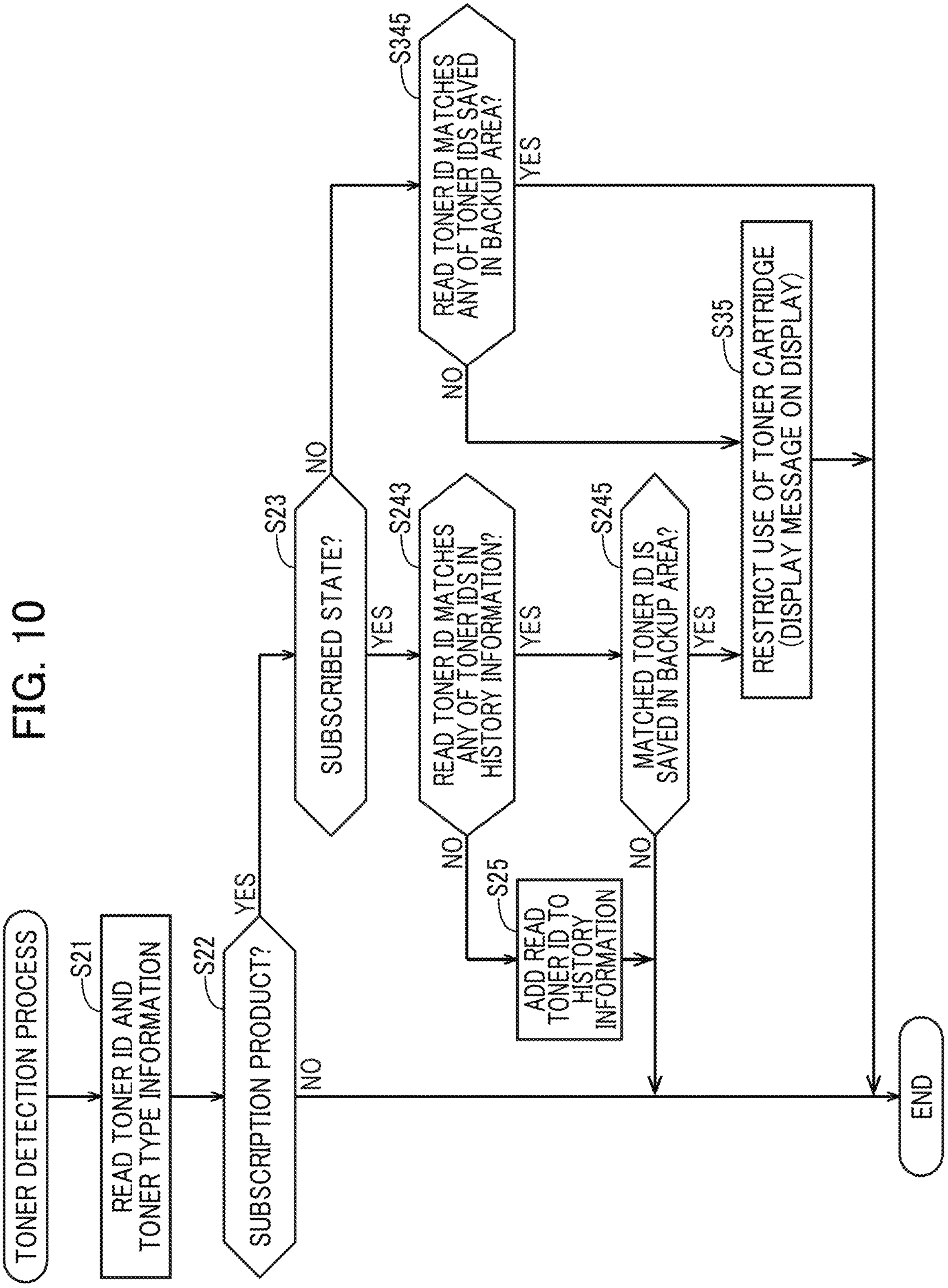
FIG. 10 is a flowchart illustrating steps in a toner detection process executed by the control unit.

FIG. 10 is a flowchart illustrating steps in the toner detection process executed by the control unit 51 in the third embodiment. Next, the toner detection process will be described with reference to FIG. 10 while omitting descriptions of steps identical to those in the toner detection process shown in FIG. 4.

When the control unit 51 determines in the subscription determination process of S23 that the image forming apparatus 1 is in a subscribed state in the third embodiment (S23: YES), in S243 the control unit 51 determines whether the toner ID read in the reading process of S21 matches any of toner IDs included in the history information stored in the main memory 513 or toner IDs saved in the backup area 61 (history determination process).

When the toner ID does not match any of the toner IDs included in the history information or saved in the backup area 61 (S243: NO), in S25 the control unit 51 adds the toner ID to the history information (storage process). Subsequently, the control unit 51 ends the process in FIG. 10 without restricting use of the subscription cartridge 30. In other words, the control unit 51 permits use of the toner cartridge 30.

On the other hand, when the toner ID matches one of the toner IDs included in the history information or saved in the backup area 61 (S243: YES), in S245 the control unit 51 determines whether the matched toner ID is any of toner IDs saved in the backup area 61 (history identification process).

When the toner ID read in the reading process of S21 matches one of the toner IDs saved in the backup area 61 (S245: YES), the control unit 51 executes the restriction process of S35.

However, when the matched toner ID is not any of the toner IDs saved in the backup area 61 but one of the toner IDs included in the history information (S245: NO), the control unit 51 ends the toner detection process without executing the restriction process of S35. In other words, the control unit 51 permits use of the subscription toner cartridge 30.

On the other hand, when the control unit 51 determines in the subscription determination process of S23 that the image forming apparatus 1 is in a normal state (S23: NO), in S345 the control unit 51 determines whether the toner ID read in the reading process of S21 matches one of the toner IDs saved in the backup area 61 (history identification process).

When the toner ID matches one of the toner IDs saved in the backup area 61 (S246: YES), the control unit 51 ends the toner detection process without executing the restriction process of S35. In other words, the control unit 51 permits use of the subscription toner cartridge 30.

However, when the toner ID does not match any of the toner IDs saved in the backup area 61 (S345: NO), the control unit 51 executes the restriction process of S35.

As described above, when the image forming apparatus 1 receives a cancellation instruction in the third embodiment, the control unit 51 saves the toner IDs included in the history information in the backup area 61 of the main memory 513 in the backup process of S51. The control unit 51 then determines in the history identification process of S245 or S345 whether the toner ID read in the reading process of S21 matches any of toner IDs saved in the backup area 61. With this configuration, when the image forming apparatus 1 is resubscribed, the control unit 51 can distinguish based on toner IDs in the backup area 61 between subscription toner cartridges used under a previous contract and new subscription toner cartridges to be used after the image forming apparatus 1 is resubscribed. Thus, the control unit 51 can effectively control whether the user can use subscription toner cartridges provided under a previous contract.

When the image forming apparatus 1 receives, after receiving a cancellation instruction, a subscription instruction, i.e., when the image forming apparatus 1 is resubscribed, the control unit 51 determines in the subscription determination process of S23 that the image forming apparatus 1 is in a subscribed state and executes the history identification process in S245. When the control unit 51 determines in S245 that the toner ID does not match any of the toner IDs saved in the backup area 61, the control unit 51 permits use of the toner cartridge 30. However, when the control unit 51 determines in S245 that the toner ID matches one of the toner IDs saved in the backup area 61, the control unit 51 executes the restriction process of S35. With this configuration, the user can be restricted from using subscription toner cartridges 30 that were provided under a previous contract when the image forming apparatus 1 has been resubscribed. Therefore, the user can be prompted to use new subscription toner cartridges 30.

4. Modifications

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

While the image forming apparatus 1 described above is an electrophotographic printer, the image forming apparatus 1 may instead be an inkjet printer. When the image forming apparatus 1 is an inkjet printer, the cartridges in the apparatus may be ink cartridges that supply ink. In this case, the content of the present disclosure is applied to the ink cartridges. As another alternative, the cartridge may be a tape cassette that supplies tape as the printing base material. In this case, the content of the present disclosure is applied to the tape cassette. Further, the present disclosure is not limited to the form described above in which the drum cartridge 20 has the photosensitive drum 21 and the toner cartridge 30 has the developing roller 31.

For example, the developing roller 31 of the toner cartridge 30 may be provided in the drum cartridge 20. In this case, the outer circumferential surface of the developing roller 31 contacts the outer circumferential surface of the photosensitive drum 21 inside the drum cartridge 20.

Alternatively, a plurality of toner cartridges 30 may be configured to be attachable to a single drum cartridge 20. In this case, the drum cartridge 20 may include photosensitive drums 21 of a number corresponding to the number of toner cartridges 30 attachable to the drum cartridge 20.

To the image forming apparatus 1, developing cartridges (not illustrated) each of which has the developing roller 31 may further be attachable. In this case, the developing roller 31 is omitted from each toner cartridge 30. When attaching the drum cartridge 20, toner cartridge 30, and developing cartridge to the main casing 10, the three components are held in a cartridge holding unit of the main casing 10.

In place of the drum cartridges 20 and toner cartridges 30, to the image forming apparatus 1, process cartridges (not illustrated) each of which integrates the drum cartridge 20 and toner cartridge 30 may further be attachable. Each process cartridge has the photosensitive drum 21, a memory, the developing roller 31, and the casing 33.

Further, the drum cartridge 20 or the transfer belt 41 may serve as the cartridge in place of the toner cartridge 30, and the content of the present disclosure may be applied to this drum cartridge 20 or transfer belt 41.

Note that the present disclosure includes the phrases "at least one of A and B", "at least one of A, B and C", and the like as alternative expressions that mean one or more of A and B, one or more of A, B and C, and the like, respectively. More specifically, the phrase "at least one of A and B" means (A), (B) or (A and B), and the phrase "at least one of A, B and C" means (A), (B), (C), (A and B), (A and C), (B and C) or (A, B and C).

What is claimed is:

1. An image forming apparatus comprising:

a main casing to which a cartridge is detachably attachable, the cartridge including a cartridge memory storing therein identification information and type information, the identification information identifying the cartridge, the type information indicating whether the cartridge is a subscription cartridge or a normal cartridge, the subscription cartridge being permitted to be used while the image forming apparatus is in a subscribed state in which a service contract is in effect for the image forming apparatus, the normal cartridge being permitted to be used while the image forming apparatus is in both the subscribed state and a normal state in which the service contract is not in effect;

a main memory configured to store therein history information, the history information including history identification information, the history identification information being identification information for a previous subscription cartridge, the previous subscription cartridge being the subscription cartridge previously attached to the main casing; and a controller configured to perform:

in response to a cartridge being attached to the main casing, (a) reading identification information from a cartridge memory of the attached cartridge as current identification information, wherein the controller is configured to further perform, after receiving a cancellation instruction for placing the image forming apparatus in the normal state:

(b) determining whether the current identification information read in (a) matches the history identification information included in the history information stored in the main memory; and in response to determining in (b) that the current identification information matches the history identification information, (c) permitting use of the attached cartridge.

2. The image forming apparatus according to claim 1, wherein, in the reading in (a), the controller further reads type information from the cartridge memory of the attached cartridge as current type information, wherein, in the determining in (b), the controller further determines whether the attached cartridge is the subscription cartridge or the normal cartridge on the basis of the current type information read in (a), and wherein the controller is configured to further perform, after receiving the cancellation instruction:

in response to determining in (b) that the current identification information does not match the history identification information and the attached cartridge is the subscription cartridge, (d) restricting use of the attached cartridge.

3. The image forming apparatus according to claim 2, wherein the controller is configured to perform, when the image forming apparatus is in the subscribed state:

the determining in (b); and in response to determining in (b) that the current identification information does not match the history identification information and that the attached cartridge is the subscription cartridge, (e) adding the current identification information to the history information stored in the main memory as the history identification information.

4. The image forming apparatus according to claim 2, wherein the controller is configured to further perform, after receiving the cancellation instruction:

(f) associating cancellation information with the history identification information included in the history information, the cancellation information indicating that the service contract under which the previous subscription cartridge corresponding to the history identification information associated with the cancellation information has been used is not in effect, and wherein, in the determining in (b), the controller further determines whether the history identification information which the current identification information matches is associated with the cancellation information.

5. The image forming apparatus according to claim 4, wherein, when receiving a subscription instruction for placing the image forming apparatus in the subscribed state after receiving the cancellation instruction, the controller performs the determining in (b), and wherein, in response to determining in (b) that the current identification information matches the history identification information with which the cancellation information is associated, the controller performs the restricting in (d).

6. The image forming apparatus according to claim 5, wherein, in response to determining in (b) that the current identification information matches the history identification information with which the cancellation information is not associated, the controller performs the permitting in (c).

7. The image forming apparatus according to claim 4, wherein when the controller has not received a subscription instruction for placing the image forming apparatus in the subscribed state after receiving the cancellation instruction:

in response to determining in (b) that the current identification information matches the history identification information with which the cancellation information is associated, the controller does not perform the restricting in (d); and in response to determining in (b) that the current identification information does not match the history identification information with which the cancellation information is associated, the controller performs the restricting in (d).

8. The image forming apparatus according to claim 2, wherein the controller is configured to further perform, after receiving the cancellation instruction:

(i) saving the history identification information included in the history information in a backup area in the main memory, and wherein, in the determining in (b), the controller determines whether the current identification information matches the history identification information saved in the backup area.

9. The image forming apparatus according to claim 8, wherein when the controller receives a subscription instruction for placing the image forming apparatus in the subscribed state after receiving the cancellation instruction:

in response to determining in (b) that the current identification information does not match the history identification information saved in the backup area, the controller performs the permitting in (c); and in response to determining in (b) that the current identification information matches the history identification information saved in the backup area, the controller performs the restricting in (d).

10. The image forming apparatus according to claim 1, further comprising:

a display, wherein, in the permitting in (c), the controller displays on the display a message indicating that use of the attached cartridge is permitted.

11. The image forming apparatus according to claim 1, wherein the history information includes a plurality of sets of history identification information, each of the plurality of sets of history identification information corresponding to a respective one of a plurality of subscription cartridges previously attached to the main casing, and wherein, in the determining in (b), the controller determines whether the current identification information matches any of the plurality of sets of history identification information.

12. The image forming apparatus according to claim 1, wherein the history information includes a plurality of sets of history identification information, each of the plurality of sets of history identification information corresponding to a respective one of a plurality of subscription cartridges previously attached to the main casing, the plurality of sets of history identification information having been added to the history information one by one, and wherein, in the determining in (b), the controller determines whether the current identification information matches any of a prescribed number of sets of history identification information, the prescribed number of sets of history identification information being selected according to a prescribed order from a most recently added set of history identification information among the plurality of sets of history identification information, the prescribed order being opposite to an addition order in which the plurality of sets of history identification information has been added to the history information.

13. A method of controlling an image forming apparatus, the image forming apparatus including: a main casing to which a cartridge is detachably attachable, the cartridge including a cartridge memory storing therein identification information and type information, the identification information identifying the cartridge, the type information indicating whether the cartridge is a subscription cartridge or a normal cartridge, the subscription cartridge being permitted to be used while the image forming apparatus is in a subscribed state in which a service contract is in effect for the image forming apparatus, the normal cartridge being permitted to be used while the image forming apparatus is in both the subscribed state and a normal state in which the service contract is not in effect; and a main memory configured to store therein history information, the history information including history identification information, the history identification information being identification information for a previous subscription cartridge, the previous subscription cartridge being the subscription cartridge previously attached to the main casing, the method comprising:

in response to a cartridge being attached to the main casing, (a) reading identification information from a cartridge memory of the attached cartridge as current identification information;

after a cancellation instruction for placing the image forming apparatus in the normal state is received, (b) determining whether the current identification information read in (a) matches the history identification information included in the history information; and in response to determining in (b) that the current identification information matches the history identification information, (c) permitting use of the attached cartridge.

* * * * *